Oct. 15, 1968 O. L. WOOD 3,405,726

PURE FLUID LOGIC MEMORY DEVICE

Filed Oct. 27, 1964

INVENTOR.
ORIN L. WOOD
BY H P Terry
ATTORNEY

United States Patent Office 3,405,726

Patented Oct. 15, 1968

3,405,726

PURE FLUID LOGIC MEMORY DEVICE

Orin L. Wood, Salt Lake City, Utah, assignor to Sperry Rand Corporation, Great Neck, N.Y., a corporation of Delaware Filed Oct. 27, 1964, Ser. No. 406,849

1 Claim. (Cl. 137—81.5)

ABSTRACT OF THE DISCLOSURE

A pure fluid non-destructive readout memory device having a bistable fluid logic amplifier coupled to a monostable pure fluid logic amplifier.

Figure 1:
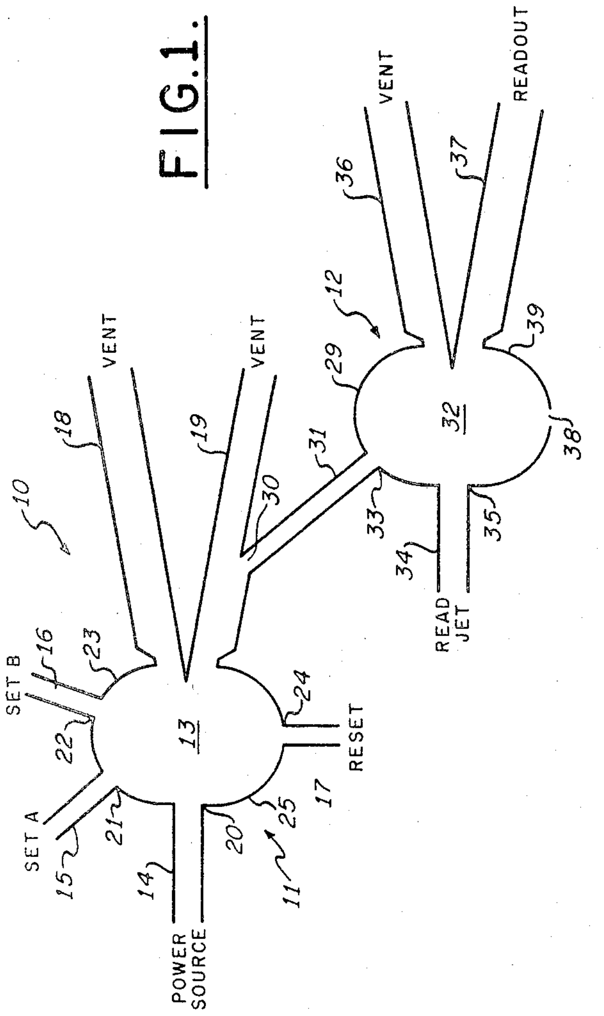

The present invention relates to pure fluid control devices and particularly to pure fluid logic devices of the type suitable for use in fluid digital computer systems.

The present invention provides a pure fluid non-destructive readout memory device which stores information and can be "read" to determine the information it contains without destroying that information. The information in a fluid non-destructive readout memory device is usually the presence or absence of a signal which is designated by a "one" or by a "zero," respectively. When the memory is set, the device contains a "one" and when reset it contains a "zero."

The memory device of the present invention provides several advantages over prior art memory devices including the fact that only a small pressure and flow signal is required to read the memory. Further, the memory device of the present invention has coincident set and reset capabilities which allows the use of majority logic techniques which feature is lacking in the prior art devices. In addition, in one embodiment, power may be supplied continuously to only one of the two elements thereby reducing the power consumption of the memory device appreciably. Further, the memory device of the present invention may utilize high speed switching fluid logic elements of the type disclosed in U.S. patent application S.N. 352,468 entitled "Multi-Mode Fluid Device" of Fox and Goldschmied, filed Mar. 17, 1964, thereby permitting a greater latitude in the operating parameters and a higher switching speed.

It is an object of the present invention to provide a fluid logic memory device which has a memory function that is relatively insensitive to environmental conditions.

It is an additional object of the present invention to provide a fluid logic memory device having a non-destructive memory.

It is a further object of the present invention to provide a fluid logic memory device having coincident set and reset capabilities.

The above objects are achieved by utilizing first and second cascaded fluid logic elements, the first of which provides the memory function and the second of which provides a readout function in order that the readout function does not interfere with the memory function.

Figure 2:
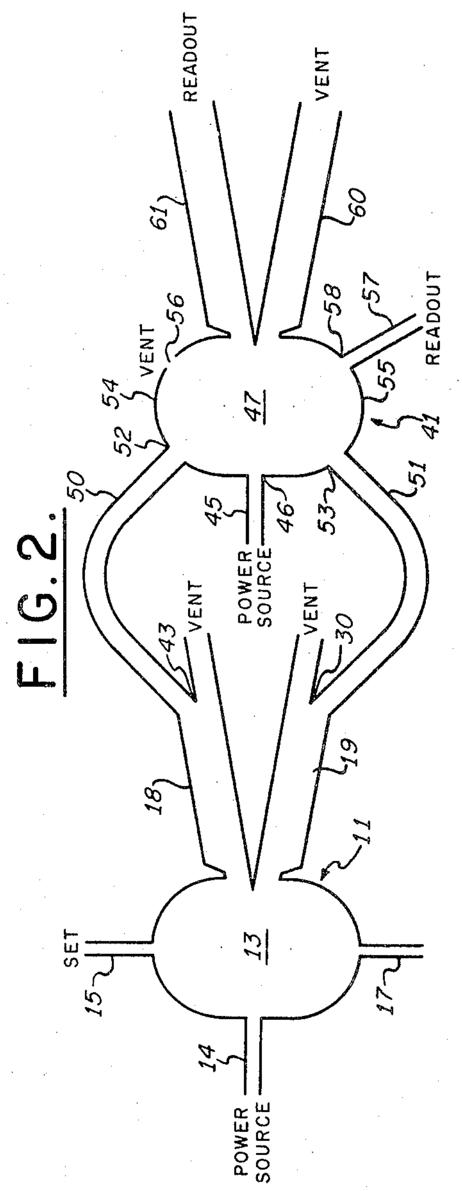

These and other objects of the present invention will become apparent by referring to the drawings in which:

FIG. 1 is a schematic diagram of a pure fluid logic memory device incorporating the present invention; and FIG. 2 is a schematic diagram of an alternative embodiment of a pure fluid logic memory device incorporating the present invention.

Referring to FIG. 1, the pure fluid logic memory device 10 of the present invention includes a pure fluid bistable amplifier 11 connected to control a pure fluid monostable amplifier 12. The amplifiers 11 and 12 may be of the type disclosed, for example, in said U.S. patent application S.N. 352,468. The bistable amplifier 11 includes an interaction chamber 13 which has in communication therewith a power stream input channel 14, first and second set control stream input channels 15 and 16, respectively, a reset control stream input channel 17 and first and second output channels 18 and 19, respectively. The power stream input channel 14 terminates in an orifice 20 in a wall of the chamber 13. The set channels 15 and 16 terminate in respective orifices 21 and 22 in one wall 23 of the chamber 13 while the reset channnel 17 terminates in an orifice 24 in an opposite wall 25 of the chamber 13. The set control streams emanating from the orifices 21 and 22 oppose the reset control stream emanating from the orifice 24 and all of the control streams are cooperative with an impact upon the power stream emanating from the orifice 20, in a manner to be more fully explained.

At least a portion of the flow through the output channel 19 is directed by means of a flow divider 30 to flow through a control stream input channel 31 of the monostable amplifier 12. The flow divider 30 may be of the type disclosed in U.S. patent application S.N. 354,-348 entitled "Fluid Flow Dividing Means for Fluid Control Devices" of H. L. Fox, filed Mar. 24, 1964. The monostable amplifier 12 includes an interaction chamber 32 which has in communication therewith the aforementioned control stream input channel 31 that terminates in an orifice 33 in a wall 29 of the chamber 32 as well as a read power stream input channel 34 which terminates in an orifice 35 in a wall of the interaction chamber 32 and further includes a venting output channel 36 and a readout output channel 37. The monostable amplifier 12 is arranged to have a monostable characteristic in order that the read stream emanating from the orifice 35 will normally flow through the venting output channel 36 because of a vent 38, for example, disposed in a wall 39 of the interaction chamber 32, in the absence of a control stream emanating from the orifice 33.

In operation, the bistable amplifier 11 is powered continuously by having its power stream channel 14 connected to a continuous source of power stream pressure fluid indicated by the legend. The bisstable amplifier 11 may be arranged to have one or more set and reset control stream channels, it being shown with two set channels 15 and 16 to emphasize the coincident set capabilities of the present invention. The magnitude of the set control signals applied to the channels 15 and 16 from the set sources A and B indicated by the legend is arranged such that both set control signals are required to cause the power stream emanating from the orifice 20 to switch from the output channel 18 to the output channel 19 if a coincident set characteristic is desired. The number of coincident pulses is limited only by the number of channels that physically can be built to communicate with the interaction chamber 13. In a similar manner, coincident resetting may also be accomplished.

Assuming set control signals applied to both channels 15 and 16, the power stream flow is through the output channel 19 with a portion thereof being directed by the flow divider 30 through the control stream input channel 31, and with a read pulse applied to the read channel 34, from a source indicated by the legend, the flow in the interaction region 32 is directed through the readout channel 37. This condition, for example, may be defined as a "one" thereby indicating there is a "one" in the memory device 10. The monostable amplifier 12 can be pulsed through its read channel 34 as often as desired without destroying the information in the memory, thus making the readout non-destructive.

Resetting of the memory device 10 is accomplished by pulsing the reset channel 17 from a source indicated by the legend thereby switching the flow from the output channel 19 to the output channel 18 and extinguishing the control stream previously emanating from the orifice 33 into the interaction chamber 32. Due to the monostable characteristic of the amplifier 12, the read pulses applied to the read channel 34 are now directed through the venting output channel 36 to provide a "zero" indication from the readout channel 37.

Referring to FIG. 2, an alternative embodiment of the present invention is shown having a bistable amplifier 11 connected to control a monostable amplifier 41. The bistable amplifier 11 may be similar to that of FIG. 1 with the exception that both output channels 18 and 19 have respective flow dividers 43 and 30.

The monostable amplifier 41 in this instance has a power stream input channel 45 which terminates in an orifice 46 in an interaction chamber 47. The monostable amplifier 41 also includes control stream input channels 50 and 51 which terminate in respective orifices 52 and 53 in opposing walls 54 and 55 of the interaction chamber 47. The fluid flow divided by the dividers 43 and 30 is connected to the control stream input channels 50 and 51, respectively. The monostable amplifier 41 further includes a vent 56 in the wall 54 which provides amplifier 41 with its monostable characteristic and a read control signal input channel 57 which terminates in an orifice 58 in the wall 55 of the interaction chamber 47. Venting and readout output channels 60 and 61, respectively, also communicate with the interaction chamber 47.

In operation, the amplifiers 11 and 41 are continuously powered through their power stream input channels 14 and 45, respectively, by virtue of being connected to one or more pressure fluid sources as indicated by the respective legends. When a fluid control signal is applied to the set channel 15, flow is directed out the output channel 19 whereas when a fluid control signal is applied to the reset channel 17, flow is directed out the output channel 18. Once flow has been established through either of the channels 18 or 19, the flow is constrained to flow in that channel after the control signal is terminated due to the bistable characteristic of the amplifier 11.

In the absence of control signal flow in both of the channels 51 and 57 of the monostable amplifier 41, the flow is through the output channel 60 due to its monostable characteristic.

To set a "one" in the memory device 10, a fluid pulse is applied to the set channel 15. Flow is then through the output channel 19 and a portion thereof enters the control signal channel 51. This control signal alone is insufficient to switch the flow from the output channel 60 to the output channel 61 of the amplifier 41. However, when a read control signal is applied from a source indicated by the legend to the control channel 57, the flow in the amplifier 41 is switched from the output channel 60 to the output channel 61 indicating that the memory is set with a "one." The ANDING of flow from the control signal channel 51 and the read control signal from one or a number of read control signal channels such as 57 is thus necessary before a readout is obtained.

To reset the memory with a "zero," a fluid pulse is applied to the reset channel 17. Flow is then through the output channel 18 and a portion thereof flows through the control signal channel 50. Although a read signal is applied through the control signal channel 57, the flow continues to be through the output channel 60. The absence of fluid flow from the output channel 61 indicates that the memory has been reset with a "zero."

Channel 50 may or may not be present for proper functioning of the memory device. With channel 50 present, the load on the bistable amplifier 11 is balanced, making it easier to maintain its bistable characteristic. However, loading can be balanced in other ways without the use of channel 50, such as restricting the size of channel 18 which vents to ambient pressure. The presence of flow through channel 50 makes it very unlikely that a "read" fluid signal at channel 57 will cause a spurious output at channel 61 when the memory device is in the reset condition. It has been found experimentally that when channel 50 is present, there is a wider latitude of pressures and flows through channels 50 and 51 for which monostable amplifier 41 will "AND" properly.

A feature of the present invention is that one or more or a combination of fluid signals can be used to obtain a readout of the memory device, the read signals requiring only a small pressure and flow. This is an important advantage when the pressure and flow of fluid control signals in a fluid computer or control system are limited to small values.

It will be appreciated that in either embodiment a multiplicity of set channels such as 15 may be provided and similarly, a multiplicity of reset channels such as 17 may be supplied. Further, a multiplicity of read channels such as 57 may be provided. This permits the use of coincident logic as well as majority or minority logic techniques to set, reset and read the memory device 10. These techniques can be used in any combination; e.g., a coincidence of signals necessary to set the amplifier 11, a majority of possible signals present to reset the amplifier 11, and a minority of possible signals present to read the amplifier 41.

While the invention has been described in its preferred embodiments, it is to be understood that the words which have been used are words of description rather than limitation and that changes within the purview of the appended claim may be made without departing from the true scope and spirit of the invention in its broader aspects.

What is claimed is:

1. A pure fluid logic device comprising, (a) a bistable pure fluid logic element having a power stream input channel for defining a power stream, a plurality of set and reset control stream channels for defining a like plurality of opposing set and reset control streams cooperative with said power stream, first and second output channels each defining a path of fluid flow and an interaction chamber communicating with said channels, (b) a plurality of set control signal sources connected to respective set control stream channels, (c) a plurality of reset control signal sources connected to respective reset control stream channels, and (d) a monostable pure fluid logic element having a first channel for defining a fluid flow, a plurality of control stream channels connected to said first and second bistable element output channels for defining a like plurality of opposing control streams cooperative with said fluid flow, at least one read control stream channel for providing at least one read control stream cooperative with one of said monostable control streams for providing a one signal, first and second output channels each defining a path of fluid flow, an interaction chamber communicating with said channels, and means for providing said monostable element with its monostable characteristic whereby said fluid flow normally tends to flow through said first monostable amplifier output channel in the absence of a control stream in said monostable interaction chamber for providing a zero signal and in the presence of a monostable control stream flow and a read control stream flow said fluid flow tends to flow through said second monostable amplifier output channel for providing a one signal.

References Cited

UNITED STATES PATENTS

| | | | |
|---|---|---|---|
| 3,191,858 | 6/1965 | Sowers | 137—81.5 |
| 3,240,219 | 3/1966 | Dexter | 137—81.5 |
| 3,272,214 | 9/1966 | Warren | 137—81.5 |

M. CARY NELSON, *Primary Examiner.*

W. R. CLINE, *Assistant Examiner.*